United States Patent [19]

Ng et al.

[11] Patent Number: 5,121,205
[45] Date of Patent: Jun. 9, 1992

[54] APPARATUS FOR SYNCHRONIZING MAIN AND AUXILIARY VIDEO SIGNALS

[75] Inventors: Sheau-Bao Ng, Plainsboro; Hugh E. White, Pennington, both of N.J.

[73] Assignee: General Electric Company, Princeton, N.J.

[21] Appl. No.: 609,349

[22] Filed: Nov. 5, 1990

[30] Foreign Application Priority Data

Dec. 12, 1989 [GB] United Kingdom ............... 8929152

[51] Int. Cl.⁵ .............................................. H04N 7/04
[52] U.S. Cl. .................................. 358/141; 358/133; 358/142
[58] Field of Search .............. 358/141, 142, 12, 138, 358/133, 148

[56] References Cited

U.S. PATENT DOCUMENTS

| | | | |
|---|---|---|---|
| 4,866,509 | 9/1989 | Guida | 358/12 |
| 4,888,641 | 12/1989 | Isnardi et al. | 358/141 |
| 5,003,377 | 3/1991 | Lippman et al. | 358/142 X |
| 5,036,391 | 7/1991 | Auvray et al. | 358/141 X |

OTHER PUBLICATIONS

Aartsen, G. et al., "Error Resilience of a Video Codec for Low Bitrates", Int. Conference on Acoustics, Speech, and Signal Processing, New York, Apr. 1988, pp. 1312-1315.

Underwood, E. M., "Broadcast-Quality Television 45 MBIT/SEC (DS3) Encoding Algorithm", SMPTE Journal, Sep. 1988, pp. 678-686.

Ghanbari, M., "Two-Layer Coding of Video Signals for VBR Networks", IEEE Journal on Selected Areas in Communications, vol. 7, No. 5, Jun. 1989, pp. 771-781.

Bertsekas, et al., *Data Network*, Prentice-Hall, p. 76 et seq.

Primary Examiner—Victor R. Kostak
Attorney, Agent, or Firm—Joseph S. Tripoli; Eric P. Herrmann; Ronald H. Kurdyla

[57] ABSTRACT

A system for synchronizing first and second video signals which are to be combined is disclosed. The second signal is data compressed digital signal containing macro blocks of composite data preceded by a field sync flag synchronized with the field rate of the first signal. Each macro block contains a video block including a plurality of image line blocks. Each line block contains multiplexed video data such as luminance and chrominance information preceded by a marker flag. The flag preceding the first line block in a video block is a field flag which identifies the beginning of a scanning field associated with that video block. The flags preceding other line blocks in that video block identify the other line blocks respectively. Each flag contains a unique data preamble which identifies the associated line block. Illustratively, field flag data includes unique header, field number, and "performance index" data for controlling data quantization. Line block flag data includes unique header, line block number and performance index data.

23 Claims, 5 Drawing Sheets

APPARATUS FOR SYNCHRONIZING MAIN AND AUXILIARY VIDEO SIGNALS

FIELD OF THE INVENTION

This invention concerns apparatus for maintaining a desired relationship between two video signals such as may be intended to be combined to produce a reconstituted video signal.

BACKGROUND OF THE INVENTION

Various video signal processing systems using an auxiliary signal to augment a main signal are known. For example, the auxiliary signal may contain additional high frequency image information which for various reasons could not be included in the main video signal. The auxiliary signal also can include information useful for error correction and artifact compensation purposes.

An illustrative high definition television (HDTV) system employing an auxiliary second channel containing augmentation information is disclosed in U.S. Pat. No. 4,888,641 of M. A. Isnardi et al. The system disclosed in this patent is a two channel HDTV system wherein an auxiliary channel conveys information representing the difference between encoded extended definition image information conveyed by the main channel, and image information from an original source of higher definition image information.

It is desirable to digitally process high frequency information such as may be conveyed by an auxiliary signal for various reasons, such as to produce a better signal-to-noise characteristic. The use of such digital processing may involve data compression techniques which result in a variable data rate auxiliary digital signal. In such case special steps must be taken to assure that the main and auxiliary signals, which may exhibit different data rates, are properly synchronized when they are ultimately combined to reconstitute an image signal for display. The present invention addresses this consideration among others.

SUMMARY OF THE INVENTION

In a preferred embodiment of a video system for processing a main signal and an auxiliary signal, the auxiliary signal is in digital (binary) form and comprises a sequence of macro field rate information blocks each separated by a synchronizing (sync) flag. Each sync flag helps align the auxiliary signal information with associated field rate information of the main signal. Each macro block contains a video information block containing data compressed video information. A video block comprises a series of line blocks, each containing image information from a group of horizontal image lines. Each line block is preceded by a line block flag, or marker. The first of such flags within a given field is designated as a field flag. In accordance with a feature of the invention the line block flags and the field flag are identified by a unique binary signature. Also, the line block flags and the field flag contain information as to the number of a particular field, or line block.

DETAILED DESCRIPTION OF THE DRAWING

Figure 1:
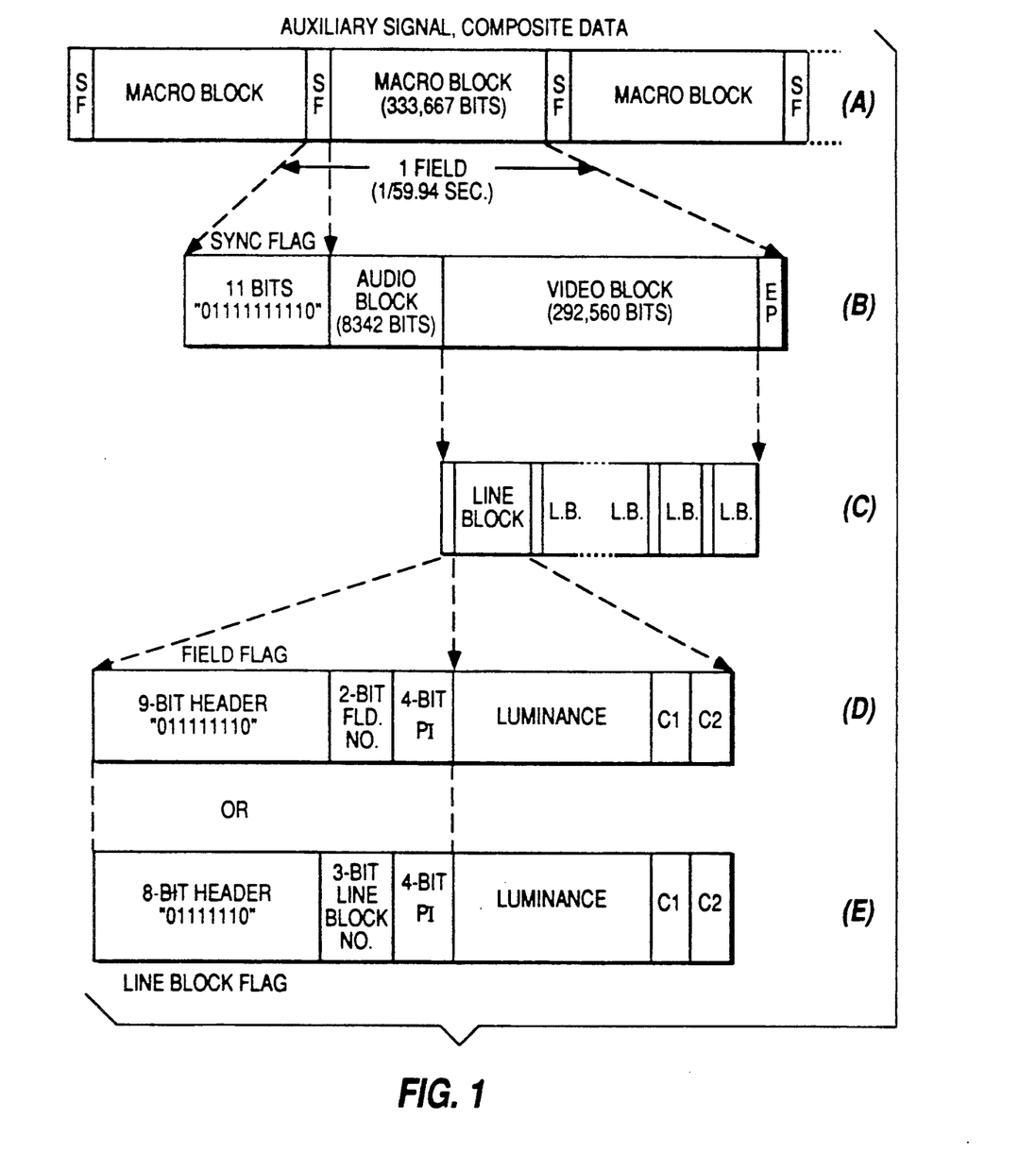
FIG. 1 shows the components of an auxiliary signal according to the present invention.

FIG. 1 illustrates the components of a digitally encoded auxiliary signal (A) in increasing detail, from component (B) through component (E). Component (A) is the basic auxiliary signal containing composite data, e.g., audio, video, sync and control information. This component contains a sequence of time multiplexed macro data blocks. A macro block is a data block between two successive sync flags (SF). The sync flags occur periodically at a 59.94 Hz field rate, substantially coincident with vertical synchronizing signals of the main signal. The sync flags represent a first level of system synchronization by maintaining a proper relationship between the main and auxiliary signals on a field-to-field basis.

As shown in component (B) each sync flag is represented by a unique eleven bit binary signature, "01111111110". Each macro block includes an audio data block and a video data block, both containing data compressed digital data. Each video block contains the data compressed video information for one field of the augmentation signal. While the number of bits in a macro block is fixed, the number of bits in a data compressed video block varies from field to field.

Each video block contains a sequence of multiplexed line blocks (LB), each containing data compressed video information, as indicated by component (C). Each line block is representative of a horizontal "stripe" and contains a group of twelve sequential horizontal scan lines of luminance information, and a group of four sequential horizontal scan lines of chrominance information for each of two color difference signals (e.g., R-Y and B-Y) designated as C1 and C2, as indicated by component (D). The luminance and chrominance information for each line block exists in time multiplexed form. Most video signal processing is confined within a line block, and video signal time compression parameters are adjusted once every line block. Each video block also contains an error protection block EP which contains information used for error detection and correction or compensation.

The line blocks typically differ in duration. Each line block is preceded by a 15-bit flag representing a line block flag, as shown in component (E), or a field flag when a particular line block is the first block in a given image field, as indicated by component (D). The field flags and line block flags represent a second level of system synchronization. Each line block flag begins with an 8-bit header "01111110" which is unique in the transmitted bit pattern. In the event of a transmission error on the compressed video block data, the line block flags advantageously allow the error to be confined to within a line block. Error propagation is therefore limited.

Each line block flag includes a unique line block marker comprising the 8-bit header and a 3-bit line block number as shown in component (E), and a 4-bit performance indicator PI. Performance indicator PI is used to control the quantization parameters as will be discussed. The line block number is a modulo-8 count of the horizontal line block (i.e., "stripe") within a 480 line field and permits a receiver to properly position the line blocks within a field to reconstitute an image. Due to the variable size of (Huffman) encoded information for each line block, the 15-bit line block flags occur at irregular intervals. To ensure the uniqueness of the flag codes within the video block, a binary 0 bit is inserted ("stuffed") into the compressed video block data after every five binary 1 bit pattern (i.e. "11111") in the video data. This bit stuffing is done at the transmitter, while at the receiver, after the header data has been identified, the binary 0 bit following every five consecutive binary 1 bits is removed, or stripped. This process of bit stuffing and bit stripping assures that the compressed video data will not have more than five consecutive binary 1 bits, thereby avoiding errors with respect to the flag data.

The field flag is similar to the line block flag except that a unique 9-bit header (011111110) is followed by a 2-bit field number. As noted earlier, a field flag precedes the first line block in a field containing a plurality of line blocks. Each field flag is designated as an FN flag, where N is an integer between 0 and 3. Four field flag designations are used, i.e., F0-F3, because in this system the main signal is delayed relative to the auxiliary signal to ensure synchronism when the signals are ultimately combined, due to the time required for transmitting and decoding the variable length codes of the data compressed auxiliary signal. Specifically, a delay of four field periods permits up to three field periods for the transmission of auxiliary information and one field period for decoding transmitted data that may be produced by a single field of the auxiliary signal. To minimize the impact on receiver cost, the delay for the main signal is provided at the transmitter. While the amount of delay at the transmitter and a certain amount of receiver delay for decoding variable length codes will vary, the overall delay of the variable length coded signal is four field periods.

The FN field flags relate a segment of auxiliary signal data and a field of the main signal. For a particular value of N between 1 and 3 inclusive, the FN flag tells the receiver that the auxiliary data following that flag is to be combined with the Nth main signal field offset from the current main signal field. For example, if the auxiliary signal data for field 23 begins transmission during field 20 of the main signal, then that data segment will be preceded by field flag F3. Field flag F0 serves a different purpose as will be discussed subsequently.

Field flags FN include a 9-bit header and a 2-bit code for field delay number N, as shown in component D of FIG. 1. Because of the bit stuffing and bit stripping operation performed on the video data to ensure the uniqueness of the 8-bit header pattern for the line block flag, the 9-bit header for the field flag will also be unique within the video data. To ensure uniqueness of the 11-bit pattern for sync flag SF (components A and B), encoder bit stuffing and receiver bit stripping is also applied on the composite data signal containing video and audio information. In this case binary 0 is inserted after every 8 consecutive binary 1 bits in the composite data. The inserted bit is stripped from the composite data at the receiver after sync flags SF have been identified. This operation is performed in addition to the bit stuffing and stripping operation performed at the compressed data level with respect to components D and E as discussed above.

Figure 2:
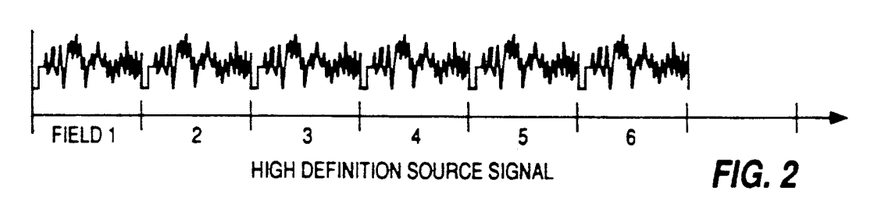
FIGS. 2, 3 and 4 depict signal waveforms helpful in understanding the operation of apparatus according to the present invention.
Figure 3:
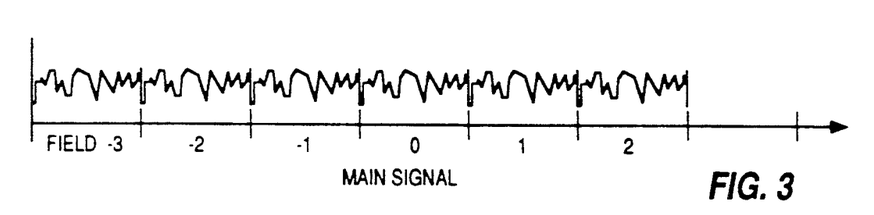
Figure 4:
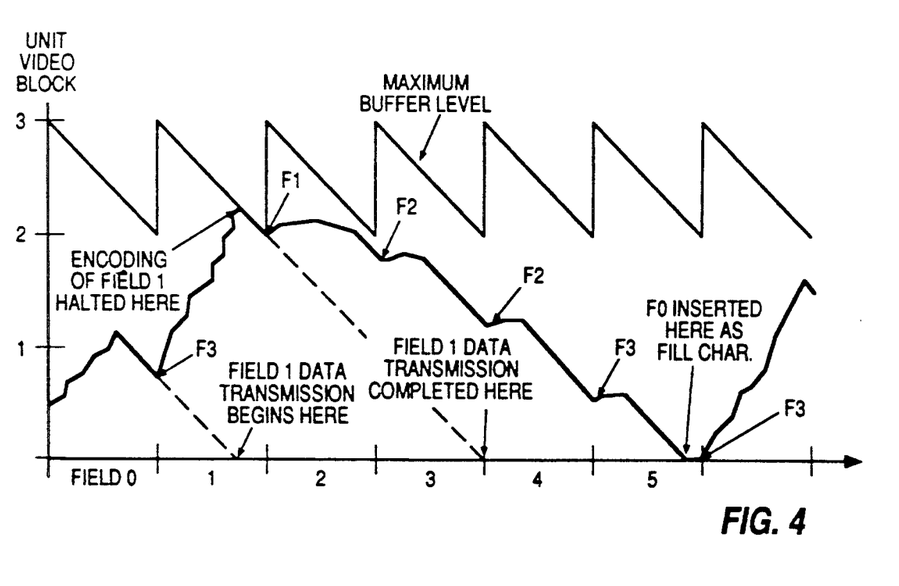

The operation of the field flags is illustrated in connection with FIGS. 2, 3 and 4. FIG. 2 illustrates the signal from a high definition source, and FIG. 3 illustrates the main signal at a transmitter output, both with field numbers designated. FIG. 4 illustrates the fill level operation of a transmitter output data buffer which processes the auxiliary signal. The data buffer and related apparatus will be shown and discussed subsequently. The main signal of FIG. 3 is shown delayed by four field periods relative to the original source signal shown in FIG. 1, while the auxiliary signal data (FIG. 4) is delayed by one field period relative to the original source signal. The reason for the four field delay was given previously. The one field delay for the auxiliary signal data is necessary when subtracting encoded main signal information for the original source signal information during a transmitter encoding operation. For example, when the field 1 component of the auxiliary signal represents a difference between field 1 of the main signal and field 1 of the original source signal as will be seen, the field 1 component of the auxiliary signal is available only after the field 1 components of the main signal and the original source signal are available in their entirety.

FIG. 4 shows the fill level of the transmitter output buffer in units of macro block, where a macro block contains an amount of data that can be transmitted in one field period. Thus a buffer containing two macro blocks of data will be empty in two field periods if no new data is added to the buffer. The irregularly-shaped bold line occupying the lower part of FIG. 4 represents the instantaneous buffer fill (occupancy) level. The sawtooth-shaped line in the upper part of FIG. 4 represents the maximum amount of data that can be placed in the buffer, at various points in time, for the data to arrive at the receiver in time for decoding. Encoding stops when the content of the data buffer reaches this maximum value.

An example is shown for processing field 1 of the auxiliary signal. The two dashed lines in the plot show the times at which the first and the last data bits from field 1 leave the buffer. The second dashed line reaches zero immediately before field 1 of the main signal (FIG. 3) starts transmission. This means that the receiver will have received all the encoded bits for the auxiliary signal field 1 by the time the main signal field 1 begins transmission. During the time the main signal field 1 is transmitted, which will be one field period, the receiver can decode the auxiliary signal. Various changes in the encoding algorithm will be invoked to avoid a buffer overflow and thereby stopping encoding. This is accomplished by selecting compression parameters for each line block as dictated by the value of performance index PI. This index is a function of the difference between the buffer fill level and the maximum level.

At the start of encoding for every field, a field flag character FN is inserted into the buffer. The value of N, the main signal field offset number, is obtained by subtracting the integer number of blocks of data in the buffer from the number 3 (three blocks of data is the maximum buffer capacity, as previously described). For example, data for field 1 is preceded by F3 because there is less than one block of data in the buffer when field 1 encoding starts. As evident from FIG. 4, data for field 1 will start transmission during the transmission of main signal field number −2, and F3 will tell the receiver that the data should be combined with field 1, i.e., starting from field −2, offset forward by 3 fields to get field number 1.

By design, field flag F0 will never occur. This flag is reserved for the purpose of a fill character whenever the buffer is empty, i.e., a buffer underflow condition. When no video data is ready for transmission, fill characters must be transmitted to fill up the channel. Characters cannot be put into the buffer because it is not known how much data will be generated by future input to the encoder. A multiplexer is required at the output of the buffer such that a buffer underflow condition will cause transmission of the fill character F0.

Figure 5:
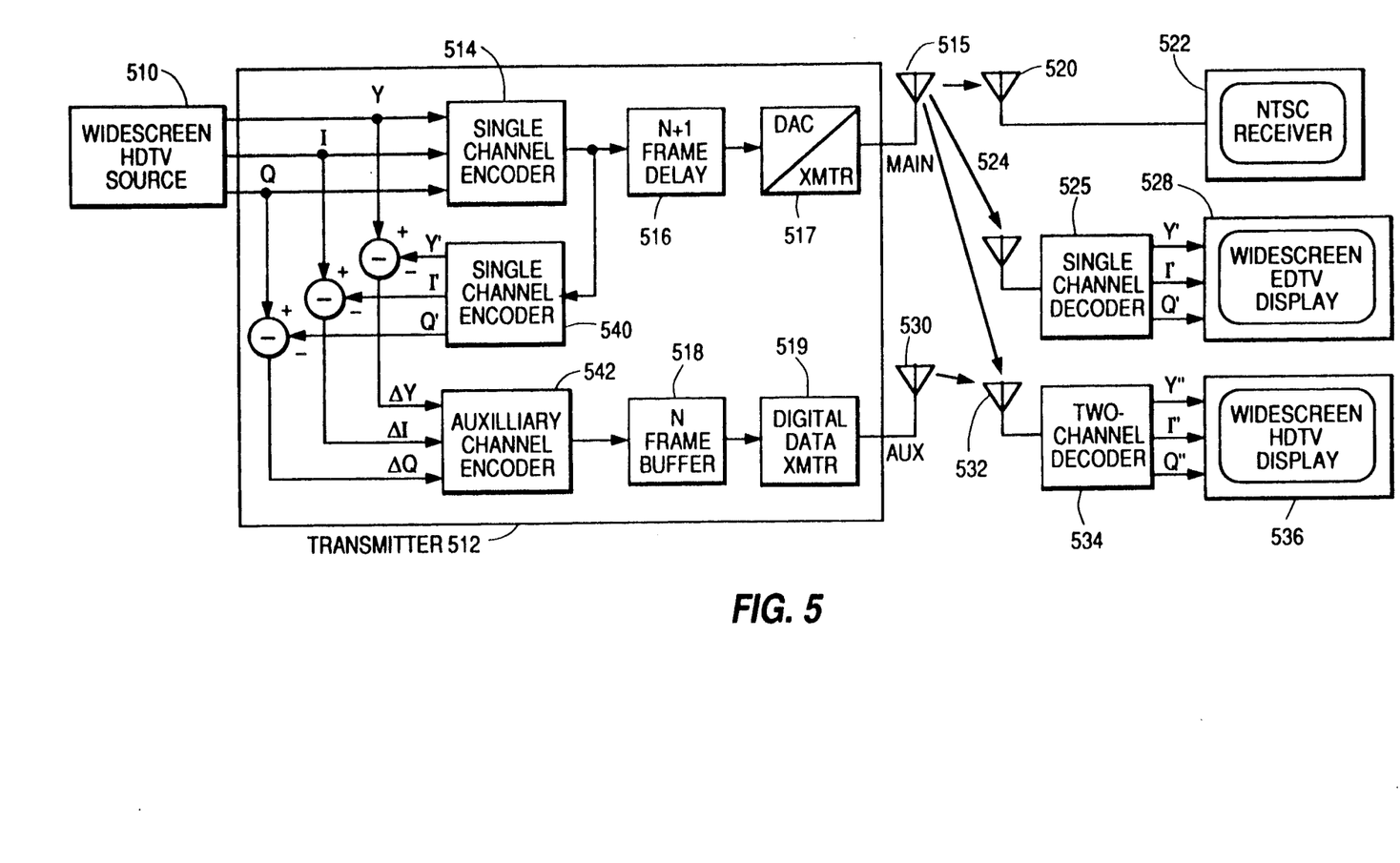
FIG. 5 is a block diagram of a high definition television system suitable for employing signal processing techniques according to the present invention.

FIG. 5 depicts a two channel high definition television system employing signal processing techniques according to the present invention. The system of FIG. 5, with the except of units 516, 518 and 519 and the specific implementation of auxiliary signal encoder 542 and decoder 534, is described in greater detail in U.S. Pat. No. 4,888,641 of M. A. Isnardi et al. Briefly, wideband widescreen high definition television (HDTV) signals Y, I and Q from a source 510 (e.g., a video camera) are applied to a transmitter 512. Luminance signal Y occupies a band of frequencies between zero Hz and 20 MHz. Chrominance signals I and Q contain information occupying a band of frequencies between zero Hz and 10 MHz. Signals Y, I and Q are encoded via a single channel encoder 514 of the type described in U.S. Pat. No. 4,855,811—Isnardi et al. to form an NTSC compatible television signal. The encoded signal is delayed by an N+1 frame delay 516 before being converted from digital to analog form and transmitted as a main, extended definition, television signal by unit 517 and an antenna 515. Television signals transmitted by antenna 515 are received by an antenna 520 of a standard NTSC receiver 522, and by an antenna 524 of a widescreen extended definition television (EDTV) receiver including a decoder 525 and a widescreen display 528. Decoder 525 is of the type described in U.S. Pat. No. 4,855,811 for decoding the received signal into constituent EDTV luminance and chrominance components Y', I' and Q'. The image information of these components is displayed by unit 528.

Auxiliary signal encoder 542 encodes signals ΔY, ΔI, ΔQ representing the difference between the widescreen EDTV signals to be displayed by unit 528, and the original widescreen HDTV signals from source 510. This difference is obtained by subtracting output signals Y', I' and Q' from a decoder 540 from the respective original HDTV signals Y, I and Q from source 510. Decoder 540 may be identical to decoder 525. An auxiliary digital signal from encoder 542, as illustrated in FIG. 1, is processed by an N-frame size buffer 518 before being transmitted by means of a transmitter unit 519 and an associated antenna 530. Unit 516 provides a delay which is one frame greater than the frame size of buffer 518.

The auxiliary signal transmitted by antenna 530 and the main signal transmitted by antenna 515 are both received by an antenna 532 associated with a widescreen HDTV receiver. This receiver includes a decoder 534 for decoding the main and auxiliary signals, and for additively combining the decoded constituent luminance and chrominance signals to produce respective widescreen HDTV component signals Y'', I'' and Q'' suitable for display by a widescreen HDTV display device 536. In this example the HDTV source is assumed to have an image aspect ratio of 5×3, either 525-line progressive scanned or 1050-line 2:1 interlaced.

Higher frequency components and components required to correct any artifacts due to the EDTV' encoding process are digitally encoded and transmitted in the digital auxiliary signal.

Figure 6:
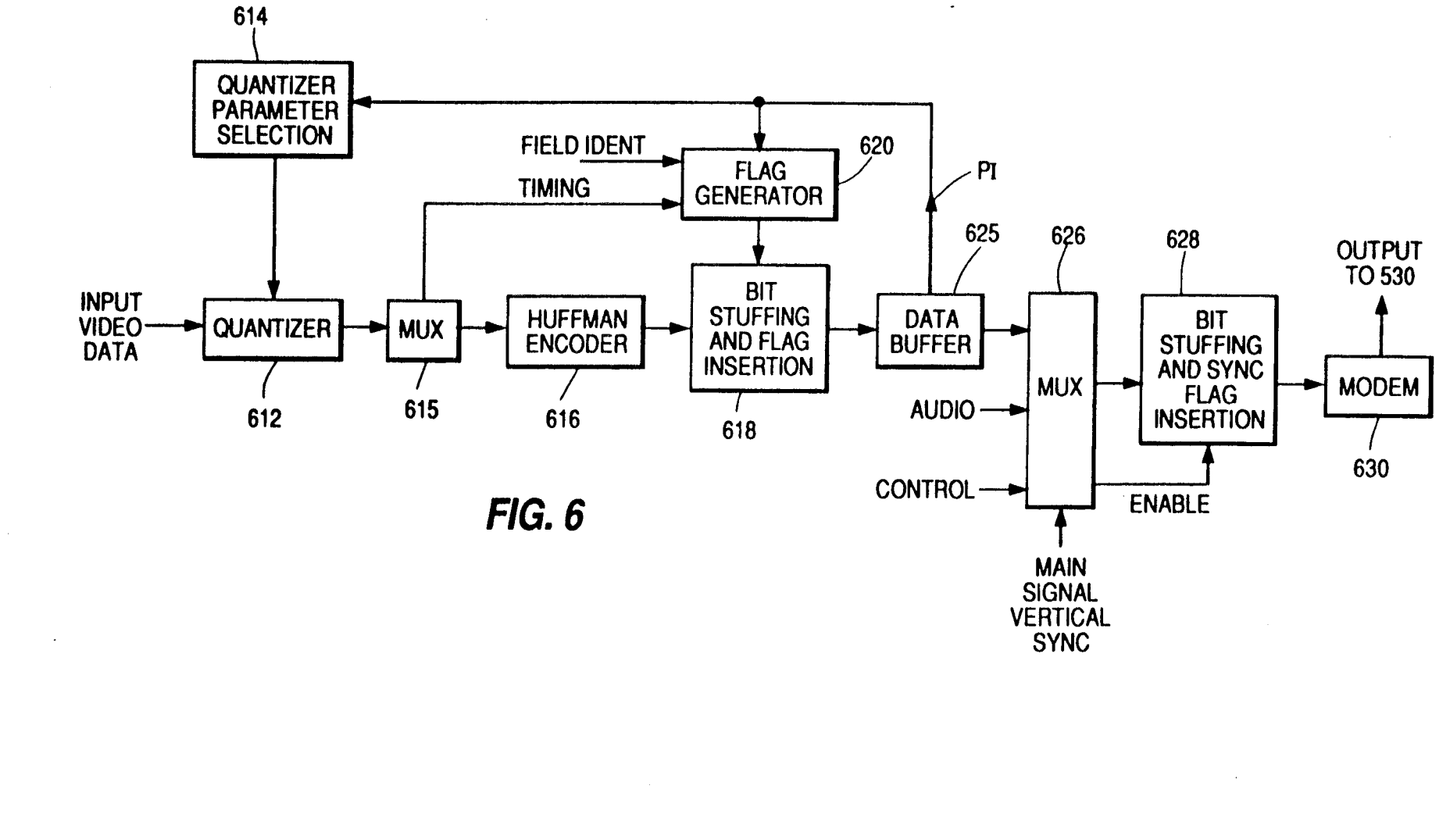
FIGS. 6 and 7 show details of apparatus for encoding and decoding an auxiliary signal as shown in FIG. 1.

The arrangement of auxiliary signal encoder 542 and buffer 518 of FIG. 5 is shown in greater detail in FIG. 6. Input video data are subjected to a variable length coding process involving quantization via a unit 612 and Huffman entropy encoding via a unit 616, as are known. Specifically, the input video signal is quantized using quantization threshold and step size parameters selected once every line block as a function of the value of performance index signal PI derived from an output data buffer 625 as a feedback signal. As explained previously, the PI signal indicates the "fill" status of output buffer 625, which modifies the quantization process accordingly.

The magnitude of each sample is compared to the quantizer threshold for an associated line block. If the sample magnitude exceeds the quantizer threshold, the sample value is replaced by the difference by which its magnitude exceeds the threshold. The sign of the sample remains unchanged. The new sample values are then uniformly quantized according to the quantizer step size for a given line block. This is achieved by scaling the sample values by the step size, and truncating the scaled sample values to their integer equivalents. The quantizer step size and threshold are adjusted once every line block by means of quantizer parameter selection unit 614, which controls the operation of quantizer 612 in response to buffer performance index feedback signal PI for a particular line block. Performance index signal PI for a particular line block is transmitted to a receiver together with other line block identifying information (component E, FIG. 1) to assure accuracy in the receiver decoding process. The use of a scale factor, or step size, to change the quantizer parameters via unit 614 advantageously permits the use of a single Huffman code look-up table for several quantizers. The luminance component and the two auxiliary chrominance difference signal components are time multiplexed together by a multiplexer (MUX) 615 before being Huffman encoded by unit 616. Unit 616 performs variable length coding for non-zero sample values and run-length coding for zero sample values. The actual encoded video data bits follow the 15-bit preamble (FIG. 1, components D,E). These video data bits comprise the luminance and the two chrominance data for a particular line block.

In Huffman encoder 616, values occurring frequently are encoded using short codes, while values with a lower probability of occurrence are encoded using longer codes. All predetermined codes are stored in a look-up table (PROM). Input values are sampled to determine if they contain zero or non-zero values. A corresponding code is sent for every non-zero value. A counter is reset when a zero value is first encountered, and the counter is incremented by one for every zero value that follows. This is the "run" of the zero values. A run is terminated by a non-zero value or when the end of an image line is reached. Alternatively, a maximum run can be set to the total number of pixels in a line block. When a zero run is terminated, a code corresponding to the value of that run is sent, followed by the code for the non-zero value that terminates the run, if present.

The Huffman encoded signal from unit 616 is subjected to a bit stuffing and flag insertion operation by means of a unit 618 before the encoded signal is conveyed to data buffer 625. Unit 618 receives the unique 15-bit field flag or line block flag (FIG. 1, components D and E), which act as field or line block identifying and separating data, from a flag generator 620. Flag generator 620 responds to a FIELD IDENT signal derived from the main signal and representative of the field number of the main signal, and generates the unique 9 or 8-bit field or line block header data and the unique 2 or 3-bit field or line block number data, as illustrated in FIG. 1. Generator 620 also responds to the 4-bit PI signal from buffer 625, and to a TIMING signal developed by logic circuits associated with MUX 615 for establishing the proper timing relationship for the field flag data and line block flag data.

The process of developing the field or line block flag signal which is applied to unit 618 by flag generator 620 involves the following steps. At the beginning of processing, unit 620 awaits a main signal FIELD IDENT signal. The FIELD IDENT signal indicates the beginning of a main signal field, and also indicates the number of that field. When this signal is detected, a 2-bit field number is computed for field flag FN, which represents the relationship between the main and compressed auxiliary signal fields. If no FIELD IDENT signal is detected, the 3-bit line block number is computed. The PI value is obtained from the data buffer and combined with the 9-bit field header and 1-bit field number to form the field flag, or with the 8-bit line block header and 3-bit line number to form the line block flag. This data is multiplexed together in response to the TIMING signal. The 15-bit field or line block flags from generator 620 are multiplexed into the data stream by unit 618.

Because of the variable length codes generated by quantizer 612 and Huffman encoder 616, the compressed data rate is variable in time. However, the digital auxiliary signal channel is a fixed-rate channel. An asynchronous buffer 625 is therefore provided in the data path prior to an output modem 630. The buffer size is related to the maximum delay that may exist between the time a bit leaves Huffman encoder 616 and the time the same bit enters a corresponding Huffman decoder at a receiver. For a buffer size of 0.9 Mbit and a video channel rate of 17.5 Mbps, the maximum delay is 51 msec, or about three field intervals. As mentioned previously, the system is constrained to a delay of four field intervals, or about 66.73 msec, allowing for up to one field interval for decoding purposes. As also mentioned previously, the status of the buffer occupancy (fill level) is used to control the amount of quantization in the video encoding process via feedback signal PI. This serves as a flow control mechanism for the input bit stream to buffer 625. The buffer occupancy status is checked once every line block. Unit 614 uses a look-up table for providing threshold and scale factor quantizer parameters to quantizer 612 as a function of the value of signal PI, for encoding the next line block. A four-bit performance index signal PI permits the use of up to 16 sets of quantizer parameters.

The contents of buffer 625 are conveyed to a synchronous data multiplexer 626 at a constant data rate equal to the total video data rate (the video block size times the field rate). MUX 626 directs video data, audio data, or miscellaneous data such as control information from buffer 625 to output modem 630 in time multiplexed form. A bit stuffing and sync flag insertion unit 628 situated between MUX 626 and modem 630 inserts sync flag SF and performs additional bit stuffing as previously mentioned, different from that performed by unit 618, to avoid errors at the boundary between multiplexed video data and audio or miscellaneous data such as control data. A vertical sync signal for the main signal is applied to MUX 626 for the purpose of developing an ENABLE signal to facilitate insertion of sync flag SF in a macro data block (FIG. 1, component A).

Modem 630 includes networks for modulating the digital data from unit 628 onto an RF carrier occupying a maximum 6 MHz bandwidth. Specifically, modem 630 uses four bits to generate a data symbol which is then spectrally-shaped by raised-cosine FIR filters. Two baseband digital signals respectively modulate quadrature phased RF carrier signals. The symbol rate of modem 630 is less than the 6 MHz RF channel bandwidth, which can support a symbol rate of about five million symbols per second (5 Mbaud). Using 16-level quadrature amplitude modulation, each symbol carries 4-bits of information, so that a total digital data rate of 20 Mbps can be realized in less than 6 MHz bandwidth.

Figure 7:
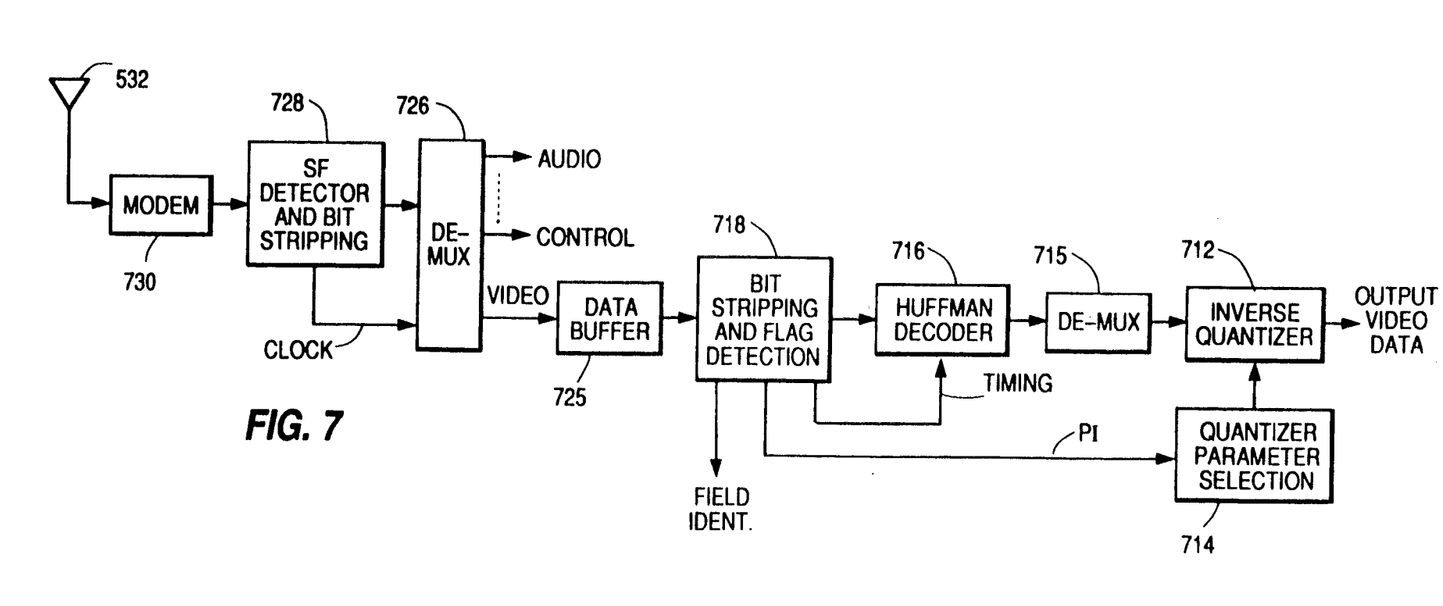

FIG. 7 illustrates apparatus for decoding the digital auxiliary signal at a receiver. The auxiliary signal decoder is found in decoder 537 of FIG. 1, together with a main signal decoder similar to units 540 and 525 as discussed in previously mentioned U.S. Pat. No. 4,888,641. The operation of the decoder apparatus of FIG. 7 is similar to that of the encoder apparatus of FIG. 6 except that the order of operation is reversed. The decoded auxiliary signal provided by the apparatus of FIG. 7 is combined with a decoded main signal to produce an HDTV signal for display.

In FIG. 7, the auxiliary signal received by antenna 532 is processed by RF demodulation apparatus (not shown) before being processed by receiver modem 730, which produces a binary data output signal. This output signal is applied to a sync flag (SF) detection and bit stripping operation performed on the compressed data by a unit 728. This unit removes the extra "stuffed" bits added at the encoder by unit 628. With the aid of detected sync flags SF, which occur at regular intervals substantially coincident with the vertical sync pulses of the main signal, unit 728 develops a CLOCK signal which is used to time the operation of a synchronous demultiplexer (DE-MUX) 726 in separating the video, audio and control data in the signal from unit 728. The separated video data from unit 726 is stored in a buffer 725.

An output signal from buffer 725 is subjected to a bit stripping and field/line block flag detection operation by a unit 718. Unit 718 detects the flag information and removes the extra "stuffed" bits inserted by unit 618 at the encoder (FIG. 6). Unit 718 also recovers the PI signal, and provides an output FIELD IDENT signal which is used to determine which of the main signal fields the output video data should be used with. Assuming no video error is detected, video data from unit 718 is conveyed to a Huffman decoder 716. If a video data error is detected, the line block containing the error can be singled out for error treatment, e.g., delete the line block or replace it with a preceding line block.

The bit stream received from unit 718 is decoded by Huffman decoder 716, which responds to a TIMING signal recovered by unit 718 and contains a duplicate of the code table employed by the Huffman encoder at the transmitter. In this example it is assumed that synchronization has been established. As each code is received, its corresponding decoded value is determined. Performance index signal PI for each line block is extracted and used in a subsequent de-quantizing process to reconstruct each line block. With the help of field flags FN, the various video blocks are identified. The output data stream from Huffman decoder 716 is split into luminance and chrominance bands by De-Mux 715.

An inverse quantizer 712 de-quantizes the data from De-Mux 715 with the inverse of the quantization parameters employed by quantizer 612 at the encoder. Inverse quantizer 712 adjusts the non-zero values of each line block according to the compression parameters used in the quantization process at the encoder. In this regard inverse quantizer 712 responds to parameters produced by a parameter selection unit 714 in accordance with the value of recovered performance indicator PI applied to unit 714. Unit 714 includes a PROM containing the inverse of the compression parameters used at the encoder, which parameters are read out to unit 712 for a particular line block according to the PI value for that line block. Non-zero values are first unscaled by the inverse of the scale factor used in the encoder quantization process. The magnitudes of the non-zero values are then increased by the amount of the threshold value used at the encoder. Zero values are excluded from the scaling and magnitude adjustment processes. The inversely quantized output signal from unit 712 is combined with the main signal data to reconstitute a high definition video image for display.

The disclosed apparatus can also be used in a single channel system, such as for encoding and EDTV signal in a single channel system.

What is claimed is:

1. A video signal processing system comprising
means for providing a first video signal containing field rate video information;
means for providing a digital second video signal representative of image definition different than the image definition represented by said first video signal;
means for data compressing said digital second video signal;
means for providing a first flag signal for synchronizing a video information block of said second signal with said field rate of said first signal, said video information block containing a number of data bits which varies from field to field; and
means for providing a second flag signal within said video block to identify video sub-blocks within said video block, said sub-blocks being subject to exhibiting mutually different time duration.

2. A system according to claim 1, wherein
each of said sub-blocks is a line block comprising a plurality of image lines; and
each of said video blocks comprises a plurality of said line blocks.

3. A system according to claim 2, wherein
each of said line blocks is preceded by a marker flag for identifying each of said line blocks.

4. A system according to claim 3 wherein
each of said line blocks contains time-multiplexed video information.

5. A system according to claim 4, wherein
said multiplexed video information is luminance and chrominance information.

6. A system according to claim 3, wherein
said marker flags contain unique header data and line block number data.

7. A system according to claim 3, wherein
a marker flag appearing at the beginning of said video block contains unique header data and field number data.

8. A system according to claim 3, wherein
said marker flags contain data for controlling a data compression parameter of video block data.

9. A system according to claim 8, wherein
said data compressing means includes data quantization means responsive to said controlling data.

10. A system according to claim 1 and further including
data buffer means for providing a data controlling signal representative of the data occupancy status of said buffer;
data quantizing means, included in said data compressing means, responsive to said controlling signal; and
means for inserting said controlling signal into said second flag signal.

11. A system according to claim 6 and further comprising
means for inserting predetermined data into said video data block to assure the uniqueness of said header data.

12. A system according to claim 1 and further comprising
means for inserting predetermined data into said second video signal to assure the uniqueness of data determining said sync flag.

13. A system according to claim 1, wherein
said first video signal is an extended definition video signal; and
said second signal contains high definition video information.

14. In a system for receiving a first television-type video signal containing data compressed video information including (a) a first flag for synchronizing a video data block at a rate related to a field rate; and (b) a second flag within said video block to identify sub-blocks within said video block subject to exhibiting variable time duration; apparatus comprising
means for detecting said first flag;
means responsive to said first flag for providing output video block data;
means for detecting said second flag;
means responsive to said output video block data and to said detected second flag for providing data de-compressed video information; and
means for combining said decompressed video information with a second television-type video signal containing image information with different definition relative to that of said decompressed video information.

15. Apparatus according to claim 14, wherein
each of said sub-blocks is a line block comprising a plurality of image lines; and
said video block comprises a plurality of line blocks.

16. Apparatus according to claim 15, wherein
each of said line blocks contains time-multiplexed video information; and said system further includes
means responsive to said decompressed information for de-multiplexing said multiplexed video information.

17. Apparatus according to claim 16, wherein
said multiplexed information is luminance and chrominance information.

18. Apparatus according to claim 15, wherein each of said line blocks is preceded by a marker flag corresponding to said second flag for identifying each of said line blocks.

19. Apparatus according to claim 18, wherein said marker flags contain unique header data line block number data.

20. Apparatus according to claim 18, wherein a marker flag appearing at the beginning of a video block contains unique header data and field number data.

21. Apparatus according to claim 18, wherein said marker flags contain data for controlling a data decompression parameter of video block data.

22. Apparatus according to claim 21, wherein said data decompressing means includes inverse quantization means responsive to said controlling data.

23. Apparatus according claim 14 and further comprising
means for stripping predetermined data bits from said received video signal.

* * * * *